(12) United States Patent
Tao et al.

(10) Patent No.: US 9,763,456 B2
(45) Date of Patent: Sep. 19, 2017

(54) ONE-STEP NOODLE FORMING MECHANISM WITH ROLLING AND CUTTING AND A NOODLE MACHINE INTEGRED WITH PRODUCING AND COOKING

(71) Applicants: BEIJING SILVER VALLEY ELECTROMECHANICAL CO., LTD., Beijing (CN); RADIAND (BEIJING) ELECTRIC TECHNOLOGY DEVELOPMENT CO., LTD., Beijing (CN)

(72) Inventors: Huishan Tao, Beijing (CN); Haichun Tao, Beijing (CN)

(73) Assignees: BEIJING SILVER VALLEY ELECTROMECHANICAL CO., LTD., Beijing (CN); BADLAND (BEIJING) ELECTRIC TECHNOLOGY DEVELOPMENT CO., LTD., Beijing (CN)

( * ) Notice: Subject to any disclaimer, the term of this patent is extended or adjusted under 35 U.S.C. 154(b) by 656 days.

(21) Appl. No.: 14/279,671

(22) Filed: May 16, 2014

(65) Prior Publication Data

US 2015/0320055 A1    Nov. 12, 2015

(30) Foreign Application Priority Data

May 7, 2014   (CN) .......................... 2014 1 0190921
May 7, 2014   (CN) ..................... 2014 2 0230445 U

(51) Int. Cl.
*A47J 37/12*  (2006.01)
*A21C 11/10*  (2006.01)
(Continued)

(52) U.S. Cl.
CPC ............... *A21C 11/10* (2013.01); *A21C 1/08* (2013.01); *A21C 11/22* (2013.01); *A47J 27/002* (2013.01);
(Continued)

(58) Field of Classification Search
CPC  A21C 11/10; A21C 1/08; A47J 27/002; A47J 2027/006
(Continued)

(56) References Cited

U.S. PATENT DOCUMENTS

| 4,083,668 A | * | 4/1978 | Bardwick, III | ........ | A21C 11/24 |
| | | | | | 425/194 |
| 4,619,189 A | * | 10/1986 | Kou | ....................... | A21C 11/22 |
| | | | | | 425/376.1 |
| 2011/0138636 A1 | * | 6/2011 | Ishii | ....................... | A21C 11/00 |
| | | | | | 30/299 |

FOREIGN PATENT DOCUMENTS

| CN | 201758739 U | * | 3/2011 |
| CN | 201797905 U | * | 4/2011 |

* cited by examiner

*Primary Examiner* — Thien S Tran
(74) *Attorney, Agent, or Firm* — Hauptman Ham, LLP

(57) ABSTRACT

A one-step noodle forming mechanism with rolling and cutting is provided, including multi-layer noodle roller sets in s disposed on a machine frame and noodle forming blades disposed below the multi-layer noodle roller sets, in which the multi-layer noodle roller sets and the noodle forming blades are driven to rotate by the same motor through a gear transmission mechanism. The dough entering the noodle forming mechanism is directly made into noodles through rolling and cutting of multiple layers. A noodle machine integrated with producing and cooking including the noodle forming mechanism is also provided.

20 Claims, 7 Drawing Sheets

(51) Int. Cl.
*A47J 27/00* (2006.01)
*A21C 1/08* (2006.01)
*A21C 11/22* (2006.01)
*F26B 5/04* (2006.01)

(52) U.S. Cl.
CPC ............... *F26B 5/04* (2013.01); *A47J 37/12* (2013.01); *A47J 2027/006* (2013.01)

(58) Field of Classification Search
USPC ......... 99/330, 334, 353; 425/72.2, 101, 194, 425/308; 426/557
See application file for complete search history.

US 9,763,456 B2

ONE-STEP NOODLE FORMING MECHANISM WITH ROLLING AND CUTTING AND A NOODLE MACHINE INTEGRED WITH PRODUCING AND COOKING

CROSS REFERENCE TO RELATED APPLICATION

This application claims two priorities of Chinese Patent Application No. 201410190921.9, filed on May 7, 2014 and Chinese Patent Application No. 201420230445.4, filed on May 7, 2014 in the SIPO (State Intellectual Property Office of the P.R.C).

FIELD OF THE INVENTION

The present invention relates to a one-step noodle forming mechanism with rolling and cutting, and in particular to a noodle machine integrated with producing and cooking, including the mechanism, belonging to the technical field of food processing.

BACKGROUND OF THE INVENTION

Noodles can be divided into sliced noodles, fresh noodles, dried noodles, and so on based on the different production processes. In hand rolled noodles, which are a type of fresh noodles, flour proteins are utilized to generate a great amount of gluten, which is distributed evenly in the noodles during the unique kneading and rolling process thereof. Gluten is composed of gliadin and glutenin. Since gluten has great extensibility and flexibility, the chewiness and taste of hand rolled noodles are better than other noodles. In prior art, due to the restrictions of the noodle producing processes and techniques, noodle producing machines fail to produce noodles with chewiness and texture equivalent to hand-rolled noodles.

Currently, the noodle producing machine commercially widely used produces noodles mostly through a pressing technique. It usually presses a flour-water mixture into a round disk shape first, then press the mixture into a sheet shape repeatedly, and finally slices the mixture into noodles with a blade, which is sliced noodles in daily life. Due to the lack of gluten proteins, sliced noodles are not chewy, have a hard texture, and taste significantly worse than hand rolled noodles.

Further, in the noodle pressing process, the process of repeatedly pressing and the process of slicing are conducted separately. In the noodle pressing process and storing process, it is required to scatter and put dry flour on noodles to prevent them from sticking together. During the cooking process, because the noodles are coated with the dry flour, the dry flour falls into the cooking pot with the noodles, making water sticky after the boiling water is repeatedly used, and affecting the quality of the cooked noodles. Therefore, when the pressed noodles are cooked on a large scale, it is required to replace the water in the cooking pot frequently, which is a great waste of flour, water, and energy.

In order to produce noodles with the chewiness and taste equivalent to or even better than hand rolled noodles through machines, the inventor made an effort to study the principles of hand rolled noodles as well as the functions and coordination of the various internal structures of noodle forming mechanisms. As a specific manifestation of the research results, the present invention provides a new type of a noodle forming mechanism.

SUMMARY OF THE INVENTION

A primary object of the present invention is to provide a one-step noodle forming mechanism with rolling and cutting, for producing noodles tasting better than hand rolled noodles.

Another object of the present invention is to provide a noodle machine integrated with producing and cooking including the noodle forming mechanism described above.

To solve the above problems, the present invention adopts the following technical features:

In a preferred embodiment of the present invention, the one-step noodle forming mechanism with rolling and cutting comprises multi-layer noodle roller sets disposed on a machine frame and noodle-forming blades disposed below the multi-layer noodle roller sets, wherein the multi-layer noodle roller sets and the noodle forming blades are driven to rotate by the same motor through a gear transmission mechanism, the bottom of the machine frame is provided with a cutting stand, the cutting stand is provided with a horizontal sliding slot, one end of the sliding slot is provided with a opening to the outside of the cutting stand, and the noodle forming blades are disposed in the sliding slot, movable back and forth along the sliding slot, and removable from the opening.

In another preferred embodiment of the present invention, the noodle machine comprises a upper housing provided with the one-step noodle forming mechanism with rolling and cutting and an inclined groove for outputting noodles, wherein the inlet of the groove for outputting noodles is disposed below the noodle outlet of the noodle forming mechanism, and the outlet of the groove for outputting noodles extends to the front outside of the upper housing.

In another preferred embodiment of the present invention, a noodle machine integrated with producing and cooking comprises the one-step noodle forming mechanism with rolling and cutting disposed on the machine frame, wherein a cooking pot is disposed below the noodle forming mechanism, a noodle basket rotary shifting mechanism is disposed inside the cooking pot, the noodle basket rotary shifting mechanism includes and a noodle basket with a handle, a rotary disk of the noodle basket, and a rotary shaft, the upper part of the rotary shaft is connected to the center of the rotary disk of the noodle basket, the lower part of the rotary shaft is connected to the center of the bottom of the cooking pot, a ball is disposed in the junction between the rotary shaft and the rotary disk of the noodle basket, a ball is disposed in the junction between the rotary shaft and the bottom of the cooking pot, a plurality of holes are disposed around the center of the rotary disk of the noodle basket, the holes are used for displacing the noodle basket, and when the rotary disk of the noodle basket rotates at any station, at least a hole is always located below the noodle outlet of the noodle forming mechanism.

The present invention provides the noodle forming mechanism and the noodle machine integrated with producing and cooking by directly processing the fermented and kneading dough for achieving the noodle rolling and slicing processes in one step and afterward finishing the noodle cooking process immediately. After rolled and pressed by the multi-layer noodle roller set in the noodle forming mechanism, a great amount of gluten is generated in the noodles, and the chewiness and taste thereof are better than hand rolled noodles. Moreover, using the machine to roll and produce noodles ensures stable quality and taste of the noodles, and is a better choice than the hand-making process. Using the noodle forming mechanism or the noodle machine integrated with producing and cooking simplifies the noodle production process, improves the noodle production efficiency and quality, and ensures the noodle quality and taste. The noodle forming mechanism and the noodle machine integrated with producing and cooking can produce a variety of flavors of noodles based on the processed dough material.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

By reference to the accompanying drawings, the specific embodiments of a one-step noodle forming mechanism with rolling and cutting, which is referred to as the noodle forming mechanism for short, and a noodle machine integrated with producing and cooking provided by the invention are described in detail as follows:

The First Embodiment

Figure 1:
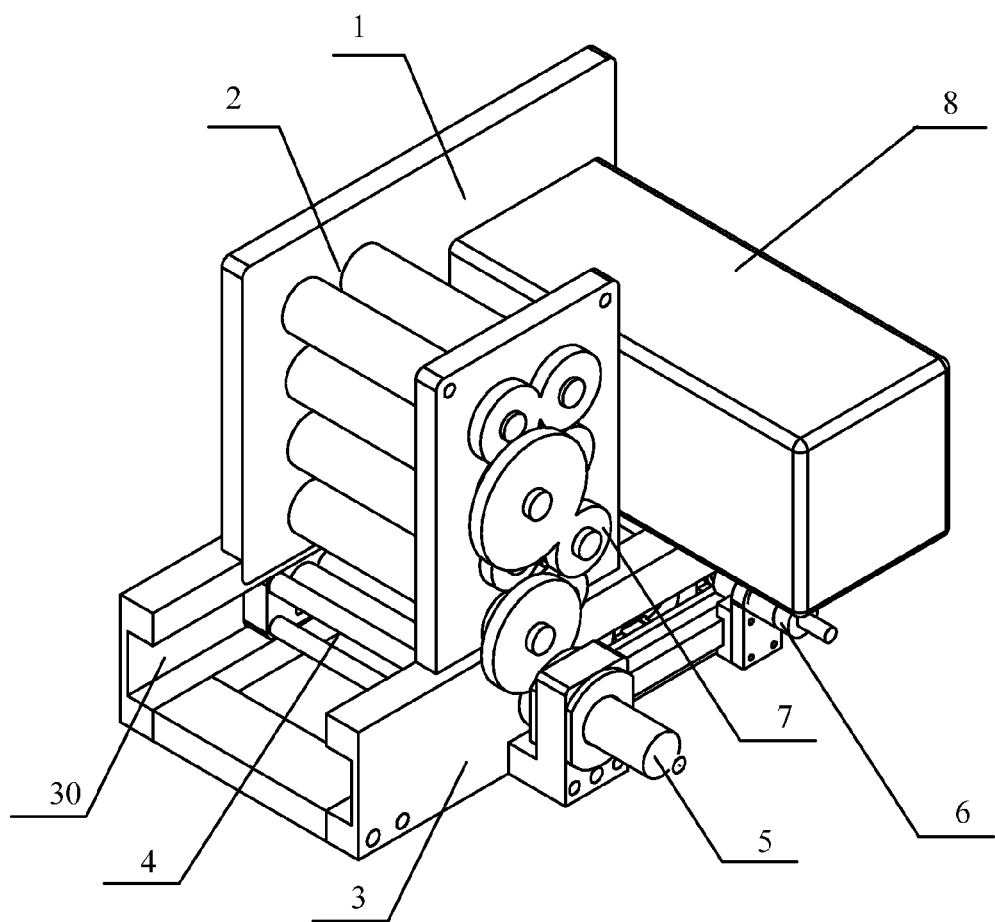
FIG. 1 is a schematic diagram of the structure of a noodle forming mechanism provided by the present invention.

Referring to FIG. 1 to FIG. 4, in a preferred embodiment of the present invention, a one-step noodle forming mechanism with rolling and cutting comprises multi-layer noodle roller sets 2 disposed on a machine frame 1 (the noodle roller sets in four layers are shown in FIG. 1), and noodle forming blades 4 disposed below the multi-layer noodle roller sets 2.

Figure 2:
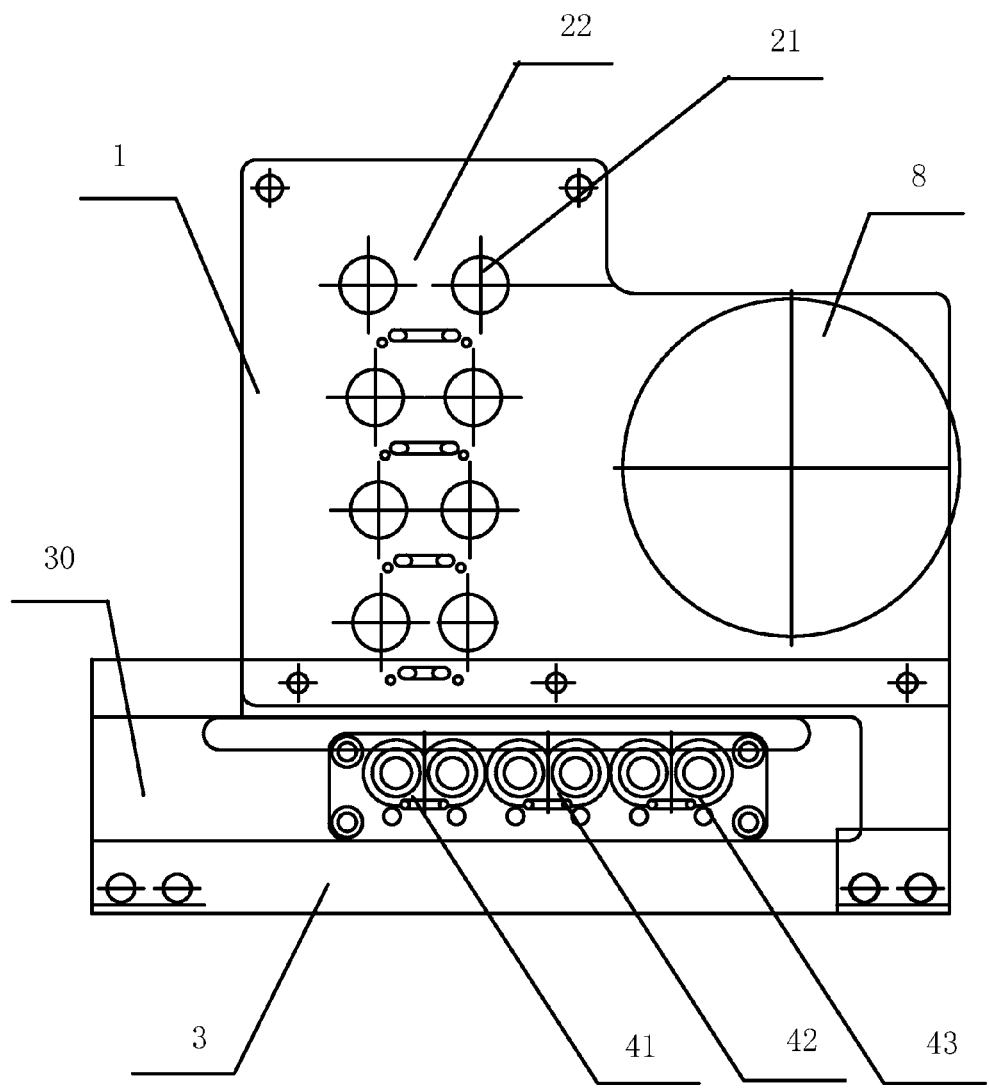
FIG. 2 is a schematic diagram of the structure of the noodle forming mechanism in FIG. 1 after a gear transmission mechanism is removed.

Referring to FIG. 2, in the multi-layer noodle roller sets in the four layers are shown in FIG. 1, the noodle roller set in each layer includes two rolling-relatively rollers 21 and a gap 22 formed between the two noodle rollers 21 allowing downward movement of dough. In the four layers of the noodle roller sets, the gap 22 in each layer of the noodle roller set gradually decreases in order from top to bottom. When the dough (dough ball) passes through the noodle roller sets in the four layers 2, the cross-section of the dough is gradually expanded, and the thickness of the dough is gradually thinned till the thickness of the dough is suitable to be sliced into noodles.

When the dough goes through the multi-layer noodle roller sets 2, in order to ensure that the process by which the noodle roller sets process the dough is equal to the hand rolling process, the intensity with which the multi-layer noodle roller sets process the dough should be determined and ensured. Therefore, the difference between the gaps in the noodle roller sets in two adjacent layers is supposed to be great. The gap ($\delta_m$) in the noodle roller set in the lower layer is preferably between ⅓ and ⅔ of the gap ($\delta_{(m+1)}$) in the noodle roller set in the upper layer, which means ⅓×$\delta_{(m+1)}$<$\delta_m$<⅔×$\delta_{(m+1)}$. Meanwhile, the rolling rates of the multi-layer noodle roller sets should be designed. In the multi-layer noodle roller sets, in order from bottom to top, the rolling rate of the noodle roller set in each layer and the gap of the noodle roller set in each layer satisfy the following equation:

$$\delta_m \times n_m \times \pi d_m < \delta_{(m+1)} \times n_{(m+1)} \times \pi d_{(m+1)} \qquad \text{Formula 1:}$$

the total layer number of the multi-layer noodle roller sets is L, (L−1)≥m≥1, $\delta_m$ is the gap between the two noodle rollers in the noodle roller set in the m-th layer, $n_m$ is the rolling rate of the noodle rollers in the noodle roller set in the m-th layers, and dm is the diameter of the noodle rollers in the noodle roller set in the m-th layers. The diameters of the noodle rollers in the different layers can be the same or different.

In the embodiment as shown in FIG. 1, the total number of layers (L) of the multi-layer noodle roller sets is four, the diameters of the noodle rollers in the noodle roller sets in the four layers are the same, and the gaps of the noodle roller sets in the four layers in order from top to bottom are halved gradually. In order to obtain the equivalent results of machine-rolling to hand-rolling, the total layer number (L) of the multi-layer noodle roller sets can be raised up to 4-6 layers. Meanwhile, the gap in the noodle roller set in each layer can be adjusted accordingly based on formula 1. For smaller dough, the total layer number (L) of the multi-layer noodle roller sets should be fewer, preferably. When the total layer number of the multi-layer noodle roller sets is over six layers, due to the difference between the gaps in two adjacent layers being small, not enough gluten is able to be generated, and the result of rolling could not be ensured. If the total layer number is increased while the great difference between two adjacent gaps is maintained, the thickness of the noodles obtained as a result will be too thin and easily over-cooked, and will affect the chewiness and taste. On the other hand, when the total layer number (L) of the noodle roller sets is fewer than 4 layers, since the number of time which the noodle roller sets squeeze the dough are reduced, the gluten which is generated will not be enough, the elasticity and flexibility of the noodles will be not optimized, and the taste will be affected.

As shown in FIG. 1, the bottom of the machine frame 1 is provided with a cutting stand 3, the top of the cutting stand 3 is fixed to the machine frame 1, and the bottom of the cutting stand 3 is provided with a opening, which is a noodle outlet corresponding to the noodle forming blades 4 and allows the noodles sliced by the noodle forming blades 4 to pass. The cutting stand 3 is provided with a horizontal sliding slot 30, one end of the sliding slot is provided with an opening to the outside of the cutting stand, and the noodle forming blades 4 are disposed in the sliding slot 30, movable back and forth along the sliding slot 30, and removable from the opening. When the use of the noodle forming mechanism is complete, the noodle-forming blades 4 can be removed from the opening of the sliding slot 30 for cleaning and maintenance.

Figure 3:
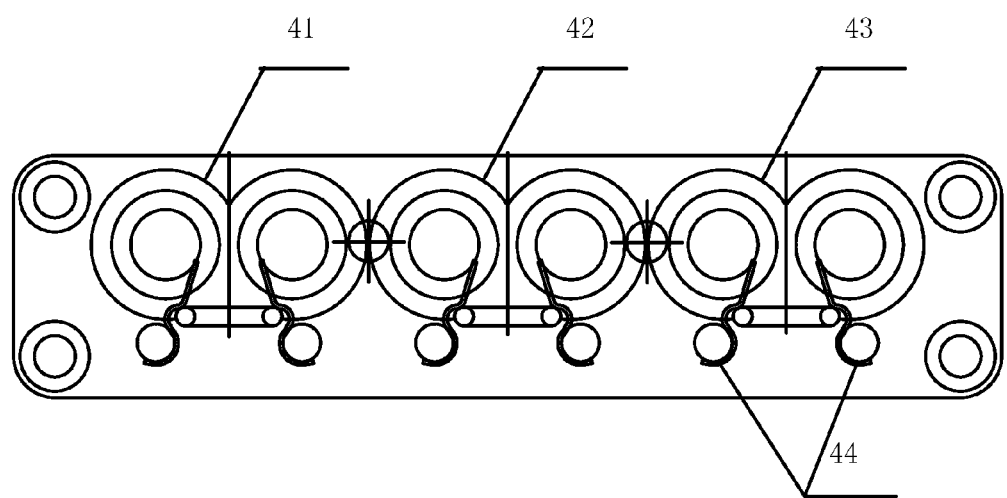
FIG. 3 is a schematic diagram of the structure of the noodle forming blades in the noodle forming mechanism in FIG. 1.

Referring to FIG. 2 and FIG. 3, the noodle forming blades 4 include multiple sets of blades for cutting noodles into different sizes, and each set of the blades includes two blades engaged with each other. Since the structure of the blades is known to a person of ordinary skill in the art, so the introduction of the structure is omitted here. In the embodiment as shown in FIG. 2, the noodle forming blades 4 comprise three blades: blades 41, blades 42, and blades 43, respectively, for processing wide noodles, medium noodles, and narrow noodles, which are noodles with three different widths. To ensure the smooth taste of the noodles, a scraper 44 is disposed below each blade, the edge of the scraper is attached to the outer surface of the lower part of the blade, as shown in FIG. 3, and a passage for passing noodles is formed between the two blades in the same set and between the two scrapers disposed below the blades.

Referring to FIG. 1, a motor 8 is disposed on the machine frame 1, the motor 8 drives the multi-layer noodle roller sets 2 and the noodle forming blades 4 to rotate through a gear transmission mechanism 7. The gear transmission mechanism 7 is composed of a plurality of mutually engaged gears disposed on two sides of the machine frame 1, and a plurality of driving shafts for linking the gears on the two sides. Furthermore, the cutting stand is provided with a clutch 5 and a shifter 6. The motor 8 drives one set of the blades of the noodle forming blades 4 through the gear transmission mechanism 7 and the clutch 5, and the shifter 6 is used for switching a different set of the blades to couple with the clutch 5. When the clutch 5 is coupled with a set of blades in the noodle forming blades 4, and the gap between the set of blades faces the gap between the noodle rollers in the lowest layer, so that the dough rolled by the multi-layer noodle roller set 2 directly enters the space between the blades and is sliced into noodles.

Figure 4:
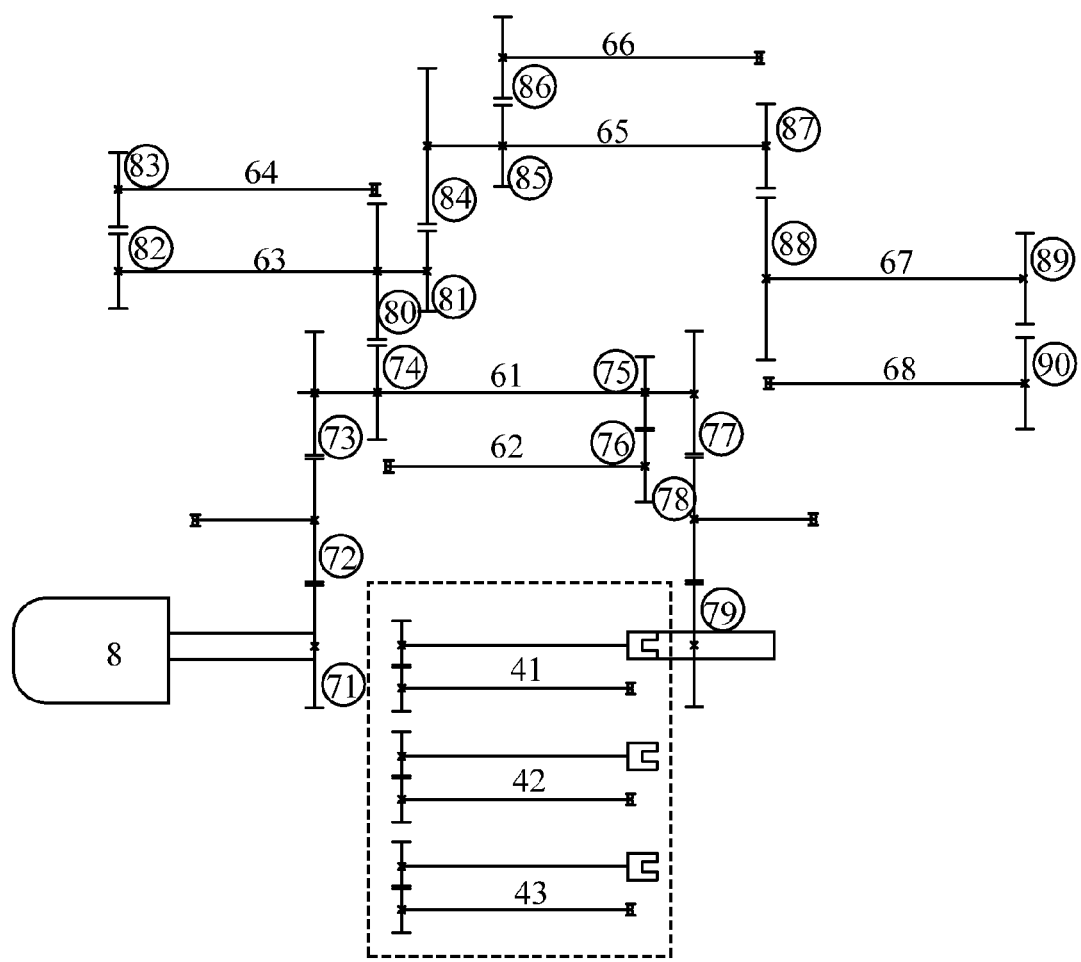
FIG. 4 is a schematic diagram of the power transmission principle of the noodle forming mechanism in FIG. 1.

By reference to the accompanying FIG. 4, the gear transmission principle of the embodiments are described as follows:

As shown in FIG. 4, the motor 8 drives a gear 71 to rotate through a drive shaft, the gear 71 drives a gear 73 to rotate through a gear 72, the gear 73 is used for driving a noodle roller of the noodle roller set in the lowest layer to rotate, which is labeled as the noodle roller 21a. Meanwhile, gears 74, 75, 77 disposed on a drive shaft (shaft 1) of the noodle roller 21a together with the gear 73 rotate simultaneously. The gear 74 drives the noodle roller set in the second lowest layer to rotate by engaging a gear 80. The gear 75 drives the other noodle roller 21b of the noodle roller set in the same layer to rotate simultaneously by engaging a gear 76. The gear 77 drives a gear 79 to rotate through a gear 78. The gear 79 drives a set of blades to rotate through clutch 5. At the same time, gears 81, 82 disposed on the same drive draft (draft 3) together with the gear 80 rotate simultaneously. The gear 81 drives the noodle roller set in the third lowest layer to rotate by engaging a gear 84. The gear 82 drives the other noodle roller of the noodle roller set in the second lowest layer to rotate synchronously by engaging a gear 83. At the same time, gears 85, 87 disposed on the same drive shaft (shaft 5) together with the gear 84 rotate simultaneously. The gear 87 drives the noodle roller set in the forth lowest layer, which is the noodle roller set in the highest layer in this embodiment, to rotate. The gear 85 drives the other noodle roller in the noodle roller set in the third lowest layer to rotate synchronously by engaging a gear 86. A gear 89 disposed on the same drive shaft (shaft 7) together with a gear 88 drives the other noodle roller of the noodle roller set in the highest layer to rotate simultaneously by engaging a gear 90.

According to the description above, in the embodiment, the motor 8 drives the noodle rollers in the noodle roller set in the lowest layer by engaging the gear. The gears in the noodle roller set in the lowest layer drives a set of blades and the noodle roller set in the second lowest layer to rotate simultaneously by engaging the gears. In the multi-layer noodle roller sets, the noodle roller set in a lower layer successively drives the noodle roller set in a higher layer to rotate simultaneously by engaging of the gears, and in the noodle rollers in the same layer, the two gears used for driving the two noodle rollers are synchronized gears.

In order to ensure the results achieved when the noodle roller sets process the dough, it is required to limit the rolling rates of the multi-layer noodle roller sets, and the following conclusion is obtained through many tests and calculations: in the multi-layer noodle roller sets, when the rolling rate ($n_m$) of the noodle roller set in each layer in order from bottom to top satisfies the following equation, formula 2, better rolling results are obtained:

$$i = n_m/n_{(m+1)}, \quad 2 \geq i > 1.6 \qquad \text{Formula 2:}$$

i increases with the increase of m, the relationship between the rotation rate ($n_c$) of the blades, and the rolling rate ($n_1$) of the noodle roller set in the lowest layer satisfies the following equation, formula 3:

$$k = n_c/n_1, \quad 1.6 > k > 1.3 \qquad \text{Formula 3:}$$

The structure of the noodle forming mechanism in the first embodiment is described in detail above. The noodle forming mechanism is suitable for processing spherical dough after the kneading and fermenting process, particularly an irregular ellipsoidal shape. The noodle forming mechanism does not particularly limit the shapes of the dough and has great adaptability to irregular shapes. The thick dough entering the noodle forming mechanism becomes thinner from top to bottom after the successive rolling and pressing process of the multi-layer noodle roller set, and then is directly sliced into noodles during the slicing process of the noodle forming blades, so as to improve the noodle production efficiency. Moreover, in the noodle forming mechanism, by designing the gaps, the rates and the coordination of the multi-layer noodle roller sets, the rolling results of the rolling mechanism are comparable to the hand rolling process, so as to generate enough gluten and realize using machines to simulate the hand rolling process of hand rolled noodles.

Using the noodle forming mechanism to produce noodles not only saves manpower and improves the processing rate, but also maintains the taste and quality of hand rolled noodles. In addition, the noodle forming mechanism directly makes noodles from dough, so as to eliminate scattering dry flour during the noodle production process, avoiding the inconvenience of replacing the water constantly, and saves flour, water, and energy.

The Second Embodiment

Figure 5:
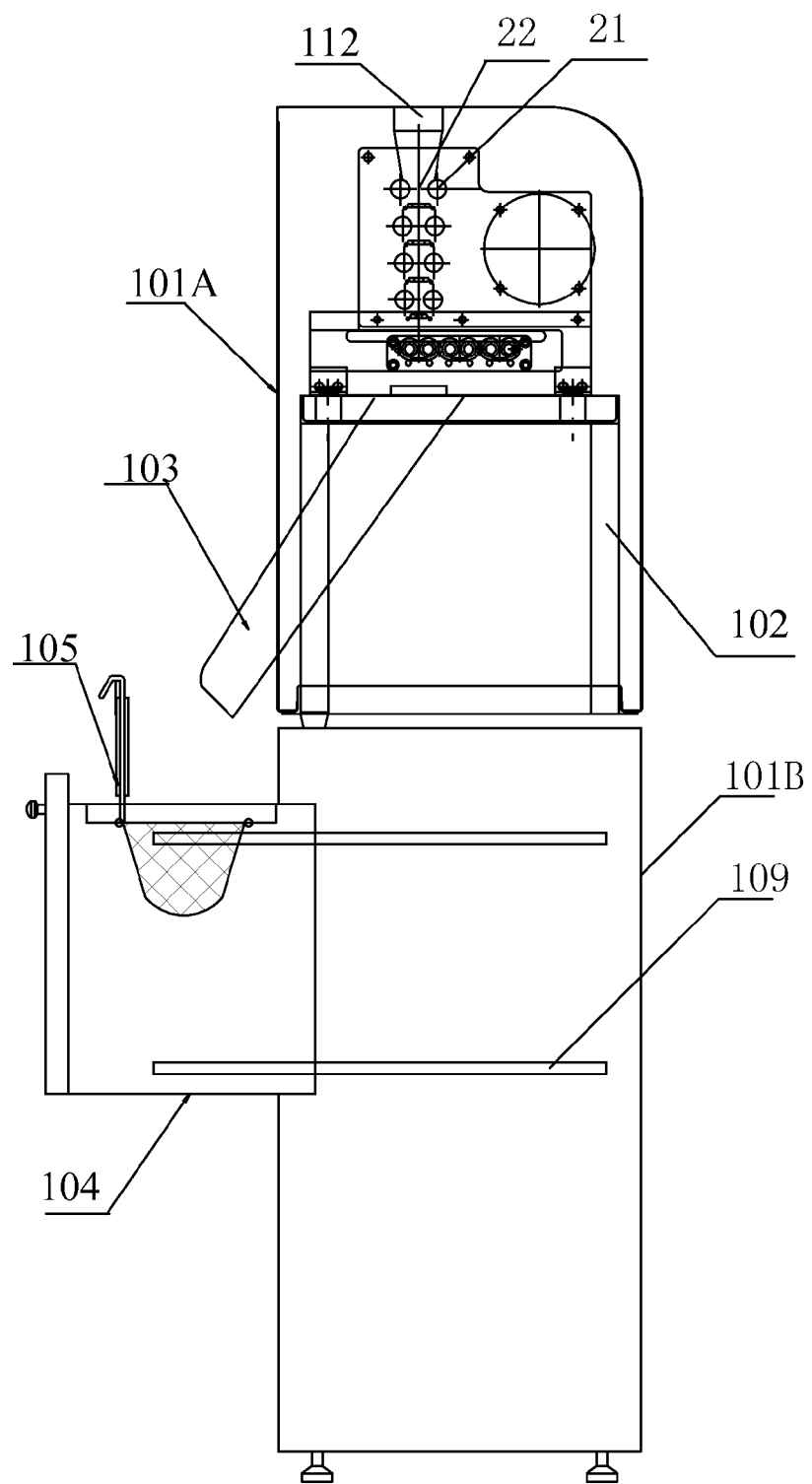
FIG. 5 is a schematic diagram of a noodle machine integrated with producing and cooking with single noodle basket.

FIG. 5 shows another preferred embodiment of the present invention. The noodle machine integrated with producing and cooking as shown in FIG. 5 comprises two parts separately, an upper housing 101A and a lower housing 101B. The upper housing 101A is provided with the one-step noodle forming mechanism with rolling and cutting as shown in FIG. 1. The structure of the noodle forming mechanism is described in detail in the first embodiment, and is not described here redundantly. Only the other parts of the noodle machine integrated with producing and cooking provided by the embodiment are described below.

As shown in FIG. 5, the top of the upper housing 101A is provided with a dough inlet 112. An upper housing 101A internally is provided with a stand 102, the noodle forming mechanism is disposed on the stand 102. An inclined groove for outputting noodles 103 is disposed in front of the stand 102. The inlet of the groove for outputting noodles 103 is disposed below the outlet of the noodle forming mechanism. The inlet of the groove for outputting noodles 103 extends to the front outside of the upper housing 101A.

A lower housing 101 B provided with a rail 109 and a drawer-like cooking pot 104. The exterior of the cooking pot 104 is provided with a rotating roller movable along the rail (not shown in FIGs). When the cooking pot 104 is pulled out to the outside of the lower housing 101B, the cooking pot 104 is located below the outlet of the groove for outputting noodles 103. The center of the cooking pot 104 is provided with a hole for placing the noodle basket 105. When the noodle basket 105 is placed in the hole, the noodles produced by the noodle forming mechanism slide into the noodle basket 105 in the cooking pot 104 through the groove for outputting noodles 103.

Moreover, the bottom or the periphery of the cooking pot 104 is provided with a heating device. The heating device can be an electrical heating device, or a heating device providing other heat sources. A water inlet opening and a water outlet opening is further disposed on the side wall of the cooking pot 104. A pipe coupled with the water inlet opening is provided with a valve and extends to the outside of the lower housing 101B for connection with an external water source. A pipe coupled with the water outlet opening extends directly to the bottom of the lower housing 101B, extends to the outside of the lower housing 101B, and can connect directly to a sewer. In the structure as shown in FIG. 5, the water inlet pipe and a water outlet pipe disposed in the lower housing 101B are not shown.

In order to ensure the stability of the noodle machine integrated with producing and cooking, an internal counter-weight can further be disposed inside the lower housing 101B. For achieving energy efficiency, the noodle forming mechanism automatically starts and stops by disposing a sensing switch near a dough inlet at the top of the upper housing 101A. By connecting the sensing switch with a counter, the total amount of noodles produced can be counted, and the production management would become easier.

In the present embodiment, by disposing the noodle forming mechanism and the cooking mechanism together, the noodle producing and cooking process can be accomplished in one step, and the storage of the noodles produced is no longer needed. On one hand, the noodle production process is simplified, and the noodle production efficiency and quality are improved. On the other hand, scattering or adding dry flour in the noodle production and storage process in the prior art is omitted for saving flour, preventing the boiling water from being thick and muddy, and keeping the boiling water clear after repeated uses. Since the boiling water can be kept clear long term, the need for the periodic replacement of the boiling water in the cooking pot is eliminated, and the utilization of the boiling water is improved, which means saving energy and water resources. Therefore, the noodle machine integrated with producing and cooking provided by the invention is an economical and environmentally friendly product.

The Third Embodiment

Figure 6:
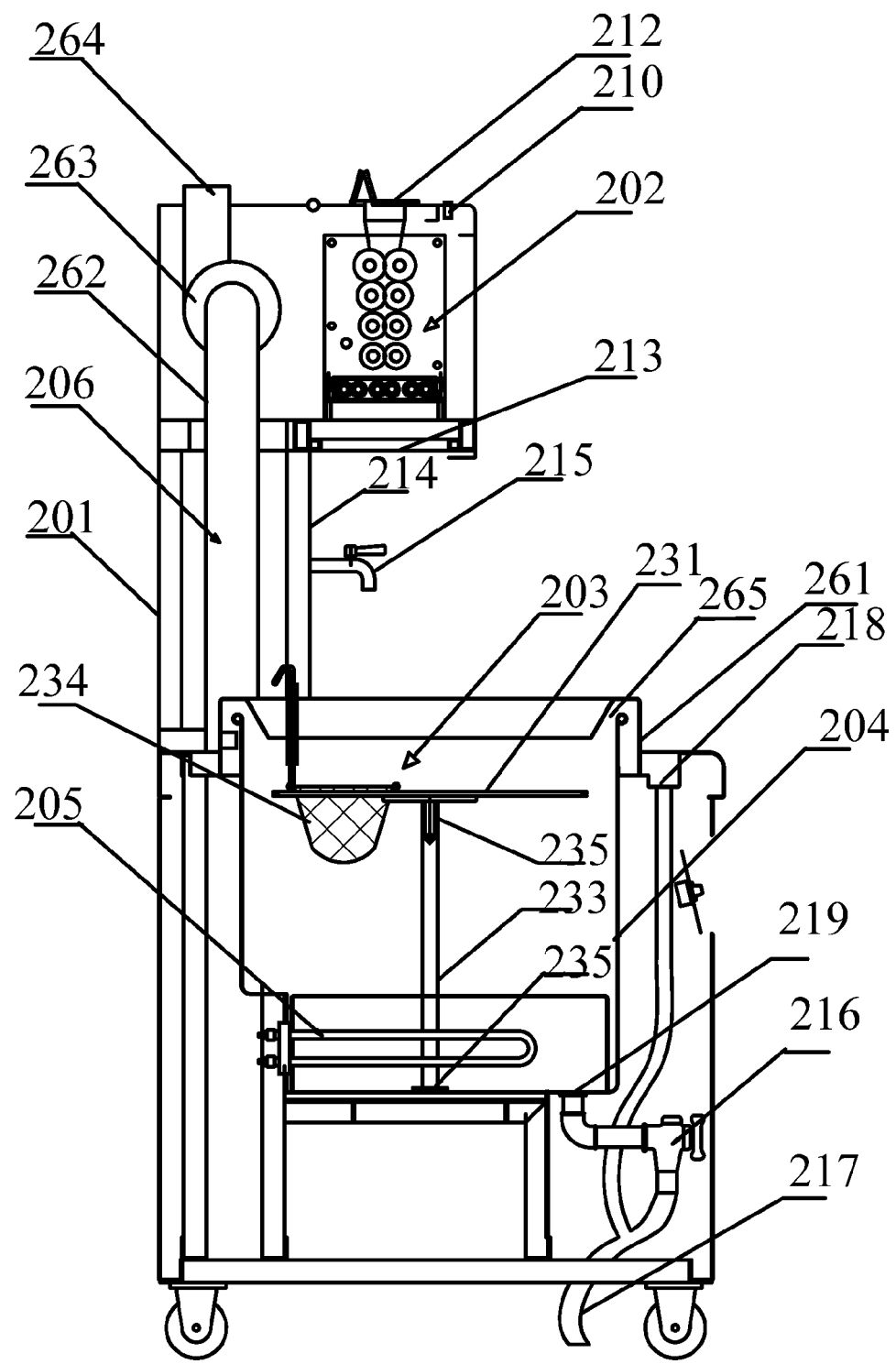
FIG. 6 is a schematic diagram of a noodle machine integrated with producing and cooking with multiple noodle baskets.
Figure 7:
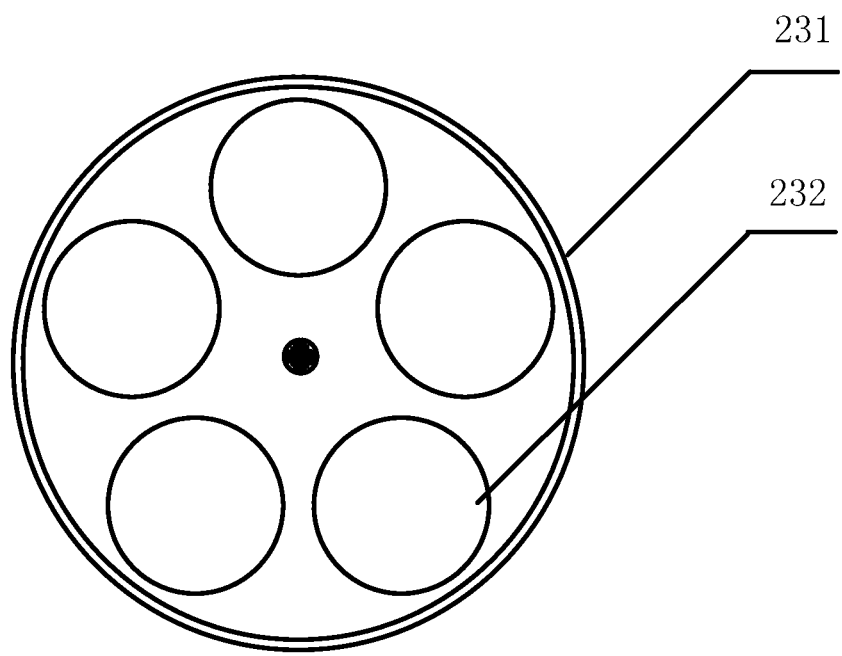
FIG. 7 is a top view of a rotary disk of noodle baskets in the noodle machine integrated with producing and cooking with the multiple noodle baskets in FIG. 6.

FIG. 6 and FIG. 7 show another preferred embodiment of the present invention. The noodle machine integrated with producing and cooking includes a machine frame 201. The noodle forming mechanism with rolling and cutting 202 as shown in FIG. 1 is disposed on the machine frame 201. The structure of the noodle forming mechanism is described in detail in the first embodiment, and is not described here redundantly. Only the other parts of the noodle machine integrated with producing and cooking provided by the embodiment are described below.

As shown in FIG. 6, a cooking pot 204 is disposed below the noodle forming mechanism. The cooking pot 204 is disposed on the middle part of the machine frame 201. The noodle basket rotary shifting mechanism 203 is disposed inside the cooking pot 204. The noodle basket rotary shifting mechanism 203 includes and a noodle basket with a handle 234, a rotary disk of the noodle basket 231, and a rotary shaft 233. The upper part of the rotary shaft 233 is connected to the center of the rotary disk of the noodle basket 231 while the lower part of the rotary shaft 233 is connected to the center of the bottom of the cooking pot 204. A ball 235 is disposed at the junction between the rotary shaft 233 and the rotary disk of the noodle basket 231, while a ball is disposed at the junction between the rotary shaft 233 and the bottom of the cooking pot 204. The rotary disk of the noodle basket 231 rotates through the ball 235 in the upper part or through the ball 235 in the lower part, so that the rotary disk of the noodle basket 231 rotates horizontally in the cooking pot 204. A plurality of holes 232 are disposed around the center of the rotary disk of the noodle basket 231, and used for placing the noodle basket 234. As shown in FIG. 7, in the embodiment, the rotary disk of the noodle basket 231 is provided with five holes for placing five noodle baskets 234. When the rotary disk of the noodle basket 231 rotates at any station, at least a hole is always located below the noodle outlet of the noodle forming mechanism.

A water inlet pipe 214 and a water inlet valve 215 are disposed above the cooking pot 204, a water outlet opening 219 is disposed at the bottom, and the water outlet opening 219 and a water outlet valve 216 are coupled with a water outlet pipe 217. The bottom or the periphery of the cooking pot 204 is provided with a heating device 205. The heating device can be an electrical heating device, or a heating device providing other heat sources.

A steam exhausting mechanism 206 is disposed on the machine frame 201. The steam exhausting mechanism includes a hood 261, an exhausting pipe 262 and a vortex fan 263. The hood 261 is disposed as a lower end of the steam exhausting mechanism 206, and is disposed above and covers the cooking pot 203. The hood is a circular shape adapted to the outer diameter of the cooking pot, and the lower part of the hood is provided with a circular exhausting groove 265. The upper rim of the cooking pot 203 extends into the circular exhausting groove 265 and leaves a gap for allowing steam to flow. The circular exhausting groove 265 is coupled with the exhausting pipe 262. The vortex fan 263 is disposed in the exhausting pipe 262, and the exhausting outlet opening 264 is disposed on the upper part of the exhausting pipe 263. The steam exhausting mechanism 206 exhausts steam in the cooking process and discharges it to the outside for improving the working environment. An overflow tank is disposed around the upper periphery of the cooking pot, and the overflow tank is coupled with the water outlet pipe 217 through a pipe. The overflow tank 218 can discharge the overflow from the cooking pot 204 to the outside the machine frame 201, and the condensated water of the hood 261 is drained off through the overflow tank 218.

In this embodiment, a sensing switch 210 is disposed near a dough inlet 212. The sensing switch 210 is couple together with the motor of the noodle forming mechanism and with a counter. When dough enters the noodle forming mechanism 202 from the dough inlet 212, the sensing switch 210 starts the motor, the motor drives the noodle roller sets and the noodle forming blades through the gear transmission mechanism, and initiates the noodle production process, while the counter counts the amount of the noodle production, and the sensing switch 210 can stop the motor rotating with a delaying device.

The noodle production process of the noodle machine integrated with producing and cooking with multiple noodle baskets provided by the third embodiment is described below.

First, the dough is divided based on the amounts, such as three or four ounce, once the dough is requested by the customer. The dough is placed into the machine from the dough inlet 212, and the sensing switch 210 starts the motor. The motor drives the noodle roller sets through the gear transmission mechanism, and the dough gradually moves down through the gaps between the multi-layer noodle roller sets. Because the gaps get more narrow from top to bottom, the rolling and pressing rate of the dough are adjusted by the different rotation rates of the noodle roller set in each layer, and the dough is rolled and pressed into a sheet shape. Afterwards, the dough in the sheet shape is sliced into noodles with blades directly. After the dough in the sheet shape is processed into noodles, the noodles directly fall into the noodle basket 234 which is able to perform rotary shift integrally in the cooking pot 203. While the dough is placed into the dough inlet continuously, the rotary disk of a noodle basket 231 in the cooking pot 203 rotates at different stations. When the fifth piece dough is processed into noodles and goes into the noodle basket 234, the noodle in the first noodle basket is already complete, then the noodle basket 234 is pulled up, and the cooked noodles are poured into a bowl. The noodle machine integrated with producing and cooking with multiple noodle baskets achieves a continuous output, and the operation is very convenient.

In summary, a noodle machine integrated with producing and cooking provided by the invention slices dough into noodles directly and puts noodles into a cooking pot, so as to conduct rolling, slicing and cooking in a continuous way. The cooked noodles are easily quantified, and the noodle production efficiency is improved. The noodle machine integrated with producing and cooking achieves a continuous output, and is ideal to be used in restaurants and cafeterias for students or workers, so as to facilitate noodle production. Meanwhile, after being sliced, the noodles are directly placed into the cooking pot, without storage. This eliminates scattering dry flour in the storage process, in order to ensure to maintain clear boiling water, not thick or muddy, and saves flour, energy and water.

The one-step noodle forming mechanism with rolling and cutting and the noodle machine integrated with producing and cooking provide by the present invention are described in detail above. For a person of ordinary skill in the art, any obvious modifications, without departing from the spirit of the present invention, will constitute an infringement of patent rights to the present invention, and will bear the corresponding legal responsibility.

What is claimed is:

1. A one-step noodle forming mechanism with rolling and cutting, comprising:
multi-layer noodle roller sets disposed on a machine frame; and noodle-forming blades disposed below the multi-layer noodle roller sets,
wherein the multi-layer noodle roller sets and the noodle forming blade are driven to rotate by a same motor through a gear transmission mechanism,
the noodle roller set in each layer includes two rolling-relatively rollers and a gap formed therebetween to allow downward movement of dough, the gap in each layer of the multi-layer noodle roller sets gradually decreases in order from top to bottom,
the gap in the noodle roller set in a lower layer, which is $\delta_m$, and the gap in the noodle roller set in a upper layer, which is $\delta_{(m+1)}$ satisfy a following equation:

$$\frac{1}{3} \times \delta_{(m+1)} < \delta_m < \frac{2}{3} \times \delta_{(m+1)}$$

a total layer number of the multi-layer noodle roller sets is L, $(L-1) \geq m \geq 1$, $\delta_m$ is the gap between the two noodle rollers in the noodle roller set in a m-th layer.

2. The one-step noodle forming mechanism with rolling and cutting as claimed in claim 1, wherein the noodle forming blades include multiple sets of blades for cutting noodles into different sizes, each set of the blades includes two blades engaged with each other, a scraper is disposed below each of the blades, a edge of the scraper is attached to a outer surface of a lower part of the blade, and a passage for passing noodles is formed between the two blades in the same set and between the two scrapers disposed below the blades.

3. The one-step noodle forming mechanism with rolling and cutting as claimed in claim 1, wherein in order from bottom to top of the multi-layer noodle roller sets, a rolling rate of the noodle roller set and the gap of the noodle roller set in each layer satisfy a following equation:

$$\delta_m \times n_m \times \pi d_m < \delta_{(m+1)} \times n_{(m+1)} \times \pi d_{(m+1)}$$

the total layer number of the multi-layer noodle roller sets is L, $(L-1) \geq m \geq 1$, $\delta_m$ is the gap between the two noodle rollers in the noodle roller set in the-m-th layer, $n_m$ is a rolling rate of the noodle rollers in the noodle roller set in the m-th layers, $d_m$ is a diameters of the noodle rollers in the noodle roller set in the m-th layers.

4. The one-step noodle forming mechanism with rolling and cutting as claimed in claim 1, wherein the total layer number (L) in the multi-layer noodle roller set is from 4 to 6 layers.

5. The one-step noodle forming mechanism with rolling and cutting as claimed in claim 1, wherein the motor drives the noodle rollers in the noodle roller set in a lowest layer to rotate through engagement of gears, the gears in the noodle roller set in the lowest layer drive the blades and the noodle roller set in a second lowest layer to rotate through the engagement of the gears, in the multi-layer noodle roller sets, the noodle roller set in a lower layer successively drive the noodle roller set in a higher layer to rotate simultaneously through a engagement of the gears, and in the noodle rollers in a same layer, a two gears used for driving the two noodle rollers are synchronized gears.

6. The one-step noodle forming mechanism with rolling and cutting as claimed in claim 5, wherein in the multi-layer noodle roller sets, a rolling rate of the noodle roller set in each layer in order from bottom to top satisfies a following equation:

$$i = n_m / n_{(m+1)}, \quad 2 \geq i > 1.6$$

i increases with a increase of m, the total layer number of the multi-layer noodle roller sets is L, $(L-1) \geq m \geq 1$, $n_m$ is the rolling rate of the noodle rollers in the noodle roller set in the m-th layer, further, a relationship between a rotation rate of the blades, which is $n_c$, and the rolling rate of the noodle roller set in the lowest layer, which is $n_1$, satisfies a following equation:

$$k=n_c/n_1, 1.6>k>1.3.$$

7. A noodle machine, comprising:
an upper housing disposed with the one-step noodle forming mechanism with rolling and cutting as claimed in the claim 1 and an inclined groove for outputting noodles, wherein an inlet of the groove for outputting noodles is disposed below a noodle outlet of the noodle forming mechanism, and a outlet of the groove for outputting noodles extends to a front outside of the upper housing.

8. The noodle machine as claimed in claim 7, further comprising:
a lower housing provided with a rail and a drawer-type cooking pot, wherein a exterior of the cooking pot is provided with an rotating roller movable along the rail, and when the cooking pot is pulled out to a outside of the lower housing, the cooking pot is located below the outlet of the groove for outputting noodles.

9. The noodle machine as claimed in claim 8, wherein a center of the cooking pot is provided with a hole for displacing a noodle basket.

10. The noodle machine as claimed in claim 8, wherein a bottom or a periphery of the cooking pot is provided with a heating device.

11. The noodle machine as claimed in claim 7, wherein a sensing switch is disposed near a dough inlet of the upper housing and coupled with a counter.

12. A noodle machine integrated with producing and cooking, comprising:
the one-step noodle forming mechanism with rolling and cutting as claimed in claim 1 disposed on the machine frame,
wherein a cooking pot is disposed below the noodle forming mechanism, a noodle basket rotary shifting mechanism is disposed inside the cooking pot, the noodle basket rotary shifting mechanism includes a noodle basket with a handle, a rotary disk of the noodle basket, and a rotary shaft, a upper part of the rotary shaft is connected to a center of the rotary disk of the noodle basket, a lower part of the rotary shaft is connected to a center of a bottom of the cooking pot, a ball is disposed in a junction between the rotary shaft and the rotary disk of the noodle basket, a ball is disposed in a junction between the rotary shaft and the bottom of the cooking pot, a plurality of holes are disposed around the center of the rotary disk of the noodle basket, the holes are used for displacing the noodle basket, and when the rotary disk of the noodle basket rotates at any station, at least a hole is always located below the noodle outlet of the noodle forming mechanism.

13. The noodle machine integrated with producing and cooking as claimed in claim 12, wherein a water inlet pipe and a water inlet valve are disposed above the cooking pot, a water outlet opening is disposed at a bottom, the water outlet opening and a water outlet valve are coupled with a water outlet pipe.

14. The noodle machine integrated with producing and cooking as claimed in claim 13, wherein an overflow tank is disposed around a upper periphery of the cooking pot, and the overflow tank is coupled with the water outlet pipe.

15. The noodle machine integrated with producing and cooking as claimed in claim 12, wherein a steam exhausting mechanism is disposed above the cooking pot, the steam exhausting mechanism includes a hood, an exhausting pipe and a vortex fan, the hood is disposed above the cooking pot and coupled with the exhausting pipe, the vortex fan is disposed in the exhausting pipe, and an exhausting opening is disposed on the upper part of the exhausting pipe.

16. The noodle machine integrated with producing and cooking as claimed in claim 15, wherein the hood is a circular shape adapted to a outer diameter of the cooking pot, a lower part of the hood is provided with a circular exhausting groove, a upper rim of the cooking pot extends into the circular exhausting groove and leaves a gap for allowing steam to flow, and the circular exhausting groove is coupled with the exhausting pipe.

17. The noodle machine integrated with producing and cooking as claimed in claim 12, wherein a heating device is disposed below the cooking pot.

18. The noodle machine integrated with producing and cooking as claimed in claim 12, wherein a sensing switch is disposed near a dough inlet of a housing and coupled with a counter.

19. The one-step noodle forming mechanism with rolling and cutting as claimed in claim 1, wherein a bottom of the machine frame is provided with a cutting stand and a horizontal sliding slot formed on the cutting stand, and the horizontal sliding slot has an opening at an end thereof and exposed to a outside of the cutting stand, and the noodle forming blades are disposed within the sliding slot, movable back and forth along the sliding slot, and removable from the opening.

20. The one-step noodle forming mechanism with rolling and cutting as claimed in claim 19, wherein the cutting stand is provided with a clutch and a shifter, the motor drives one set of the blades of the noodle forming blades through the gear transmission mechanism and the clutch, and the shifter is used for switching a different set of the blades to couple with the clutch.

* * * * *